United States Patent [19]

Kuylenstierna

[11] 3,762,958

[45] Oct. 2, 1973

[54] ELECTRICAL ACCUMULATOR CELL OR ACCUMULATOR BATTERY

[75] Inventor: John Fredrik Kuylenstierna, Oskarshamn, Sweden

[73] Assignee: Svenska Ackumulator Aktiebolaget Jungner, Oskarshamn, Sweden

[22] Filed: Feb. 5, 1971

[21] Appl. No.: 112,904

[52] U.S. Cl............ 136/134 R, 136/135 S, 136/168
[51] Int. Cl. ............................................. H01m 5/00
[58] Field of Search.................... 136/134 R, 135 S, 136/168

[56] References Cited
UNITED STATES PATENTS

| | | | |
|---|---|---|---|
| 1,106,719 | 8/1914 | Lake | 136/134 R |
| 1,259,193 | 3/1918 | Ahlgren | 136/134 R |
| 944,078 | 12/1909 | Decker | 136/134 R |
| 2,658,937 | 11/1953 | Chapman | 136/134 R |
| 1,665,772 | 4/1928 | Carpenter | 136/168 |
| 2,505,207 | 4/1950 | Riggs | 136/135 S |

FOREIGN PATENTS OR APPLICATIONS 241,014  10/1925  Great Britain .................. 136/134 R

*Primary Examiner*—Donald L. Walton
*Attorney*—Sughrue, Rothwell, Mion, Zinn & Macpeak

[57] ABSTRACT

Electric accumulator cell arranged in a cell box, the positive and negative essentially plane electrode plates being joined together into separate groups of electrodes by means of plate straps and being further lowered into a liquid electrolyte and provided with current discharging means for withdrawal of current to a consumer, said withdrawal taking place through at least two current discharging means connected to the corresponding number of plate straps on the electrode plates.

10 Claims, 12 Drawing Figures

— 3,762,958 —

ELECTRICAL ACCUMULATOR CELL OR ACCUMULATOR BATTERY

The present invention relates to a new and improved type of accumulator cells or electrical accumulator batteries made up of a number of accumulator cells consisting of cell boxes with positive and negative, essentially plane electrode plates, which are joined together into positive and negative groups of electrodes, respectively, by means of plate straps and immersed in a liquid electrolyte, and of current discharging means or terminal posts.

Known accumulator cells of this type have groups of electrodes in which the electrode plates in each group are connected to a single plate strap, from which one or two terminal posts extend up through the lid of the cell box or out through the wall of the cell box above the electrolyte level. Placement of the plate strap for an electrode group of one polarity diagonal to the plate strap for the other electrode group is also known.

For use of these batteries a fairly large discharge of current is often required during a limited period, during which the terminal voltage of the battery must not fall below a given level. A noticeable internal voltage drop then takes place in relation to the terminal voltage of the cell owing to the electric resistance in the actual cell, both on account of conduction of the current from the various points in the electrode plates, where the current is generated, up to the plate strap and on account of the connection between plate strap and terminal post, and finally owing to the resistance in the terminal post.

The object of the present invention is to diminish the electric resistance in conjunction with discharge of current from the electrodes, so improving the performance of the cell. Through the invention this is effected through the fact that the current paths in the cell are greatly shortened, chiefly because the discharge of current from every electrode or group of electrodes takes place through at least two current discharging means which are connected to the corresponding number of plate straps on the electrode or group of electrodes.

For further reduction of the resistance in the accumulator cell it is possible according to the invention to let the current discharging means take the shortest straight path out through the cell wall, whether this occurs above or below the electrolyte level in the cell. But difficult sealing problems then arise both in acid batteries, owing to the corrosive effect of the acid and to its tendency to creep, and to an even greater extent in alkaline batteries owing the known tendency of the alkaline electrolyte to "creep" past all seals. We have now discovered that the problem can be solved by arranging that at least one of the current discharging means passes with sealing effect through the side-wall of the cell box below the electrolyte level, in which case the ends of the plate straps facing the box wall must be formed into a flange and between the flange and the box wall are placed, essentially concentrically, two packings of plastic material and with different diameters of hole, and that a non-drying sealing agent which is resistant to the electrolyte in the box is placed in a space between these packings, the flange and the box wall.

The packings between which the sealing agent is enclosed may be of optional section such as square, rectangular or triangular. A preferred form is an O-ring with circular section. O-rings of this kind in different sizes are standard commercial articles.

Non-drying sealing agents suited for the purpose are usually of organic origin. In alkaline batteries, for example, one can advantageously use an agent with the trademark "Opanol," which is a liquid resin formed as a liquid or semi-liquid polymerization production of isobutylene, having good electrical insulating properties and resistant to both acids and lyes and effectively prevents any risk of "creep" of the electrolyte.

In conventional accumulator cells the terminal posts extend considerably outside the lid of the cell or, as the case may be, the side-wall. But it is a general desire that the total volume of the cells should be limited as far as possible. Through the invention the terminal parts of the accumulator cells can be arranged to lie practically on a plane with the outer wall of the cell box. This is achieved through the fact that the plate straps are attached to the wall of the cell box by fastenings in the form of externally threaded bolts fitting a corresponding internal thread in the plate strap, the bolts having at one end a flange and an internal thread in which the current discharging means is fixed. This arrangement, as will be shown later, also makes the accumulator cells easily extensible without the total volume of the accumulator battery thereby assuming unnecessarily large proportions.

This form of construction can be applied direct to cell boxes of insulating material. For cell boxes of electrically conductive material, insulators are placed on each side of the box wall at the bushing.

The design of the plate straps, referred to above, with a flange for sealing against the wall of the cell box, has other advantages as well. This flange can be used as support for fitting of the electrode plates to the plate strap. This is done according to a suitable embodiment by furnishing the ends of the plate straps remote from the flange with an external or internal thread and by clamping the electrode plates with intermediate spacers between the flange and a nut or headed screw tightened in the thread. The invention is, however, not limited to this attachment of the electrode plates to the plate strap. Within the scope of the invention, use can also be made of plate straps to which the electrode plates are fastened, for example, by welding, soldering or riveting.

According to another embodiment, in order to reduce the current paths in accumulator cells with a large number of electrode plates, the number of electrode plates with the same polarity is divided into two groups and the current discharge lugs are led out through opposing walls in the cell box. If the number of plates is not evenly divided between the two groups, unbalanced loading of the cell may arise in operation. This must always be the case if the total number of electrode plates with the same polarity is odd. This is remedied according to the invention by interconnecting the two groups of electrodes of the same polarity through an electrically conducting connecting device. This ensures an equalization of the load on the two groups. This connecting device should preferably be of a flexible material such as a tape or a cable of electrically conducting material, so avoiding mechanical strains.

Several methods are known for coupling together a number of accumulator cells into a battery. A usual method is to use a common cell box with partition walls which separate the individual cells. The junction between the cells is then usually effected through terminal posts, extending up through and a bit beyond the lid of the accumulator battery and connecting bars or cables between the terminal posts of the various cells. Bushings are also used between the various cells, which pass through the partition walls in the battery box above the electrolyte level. Connecting bars placed in sealed extensions of the sides of the battery box have also been proposed. These batteries are all limited by the number of cells the battery box is designed for. Often, however, it is desired to combine an arbitrary number of accumulator cells into a battery intended for a specific purpose, while keeping the total volume of the battery as small as possible. The coupling together of separate accumulator cells by connectors which snap into one another is already known. These connectors, however, provide poor electrical contact and poor mechanical coupling of the various accumulator cells.

A rapidly and simply coupled accumulator battery of an arbitrary number of accumulator cells according to this invention, and of very compressed design, is achieved by coupling together the accumulator cells with connecting bars running along the outer sides of the cell box, the connecting bars being clamped by means of the current discharging means.

One may also conceive of an alternative embodiment according to the invention, with every current discharging means common to two adjacent cells and having the form of a bolt with external right-hand thread at one end and external left-hand thread at the other end and a washer with external key-grip fitting slidably but not rotatably on the bolt, and the accumulator cells having the terminal devices for the current discharging means left-hand-threaded for electrode groups of a given polarity and right-hand-threaded for electrode groups of the opposite polarity.

At the outer terminals of an accumulator battery according to the invention all current discharge lugs of the same polarity may suitably be interconnected with a common bar matching the external shape of the cell.

An example of the improvement of performance in a battery according to the invention over a battery of cells of earlier known design is shown by discharge curves in FIG. 1. The curves were measured at discharge of fully charged cells with rated capacity $C = 80$ Ah. The discharge current is $5 \times C$, i.e., 400 A, and the temperature $+20°$ C. The curves show the cell voltage in relation to discharge time. The dotted curve relates to a standard cell with a single plate strap per group of electrodes and with conventional terminal posts extending up through the lid of the cell. The fully drawn curve shows the result at discharge of a battery according to the invention. Every group of electrodes has a plate strap at the upper part of the group of electrodes and one at the lower part of the group of electrodes. In both cases the current discharges take place through the nearest cell wall linearly to the respective plate strap. The battery consists of five cells connected in series with bars running along the outer sides of the cell boxes in the manner described above. The curve shows the average cell voltage during a discharge. It will be seen from the curves that the battery according to the invention shows, on an average, a more than 10 percent higher cell voltage than the conventional cell.

Another example of improvement of performance is shown by the high-load characteristic in FIG. 2. The curves were recorded with the same cells as in the preceding example and relate to fully charged cells at a temperature of $+21°$ C. The dotted curve shows the performance of the standard cell and the fully drawn curve the performance of a battery according to the invention. The curves show V/cell after a discharge time of 1 second at varying discharge current. It will be seen from the curves that the amperage withdrawable during 1 second at a voltage of, for example, 1 V and the said temperature is 45 percent greater in cells according to the invention than in conventional cells. This type of curve is used for the design of batteries for operation of starter motors. For this purpose the battery must be able to deliver a given high starting current without falling below a minimum voltage level. It will be realized that, for a given motor, it will suffice with a battery of lower capacity according to the invention than otherwise, and in this way a saving is obtained both in volume and weight since batteries with lower capacity have also a lower volume and weight.

Cells of design according to the invention become more compact than conventional cells, which in itself brings a saving of volume and weight.

The invention is explained in the following drawings.

Figure 1:
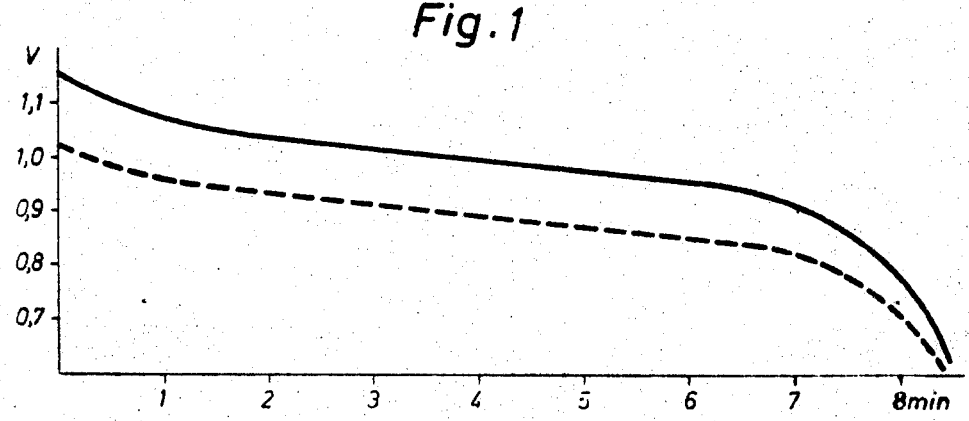
FIG. 1 shows comparative discharge curves that have already been described.
Figure 2:
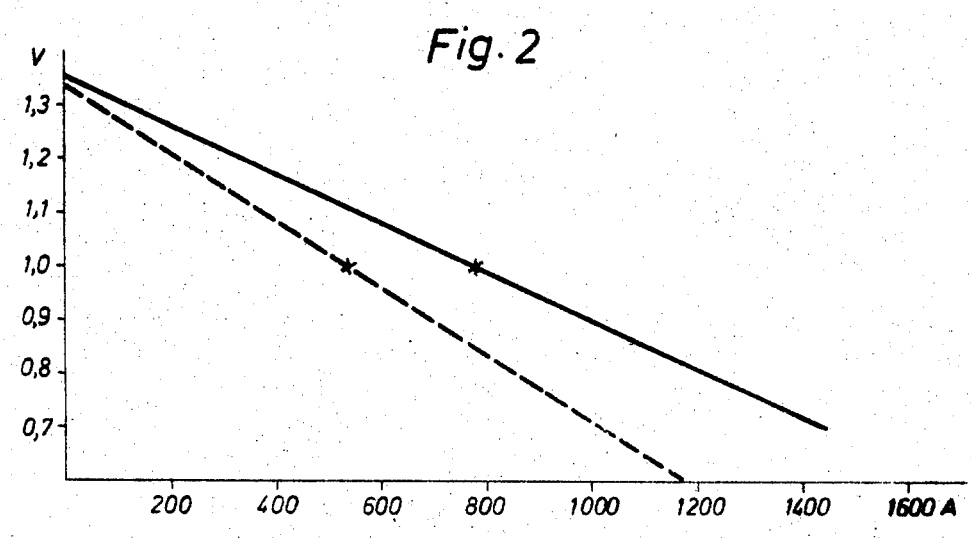
FIG. 2 shows comparative high-load characteristics that have already been described.
Figure 3:
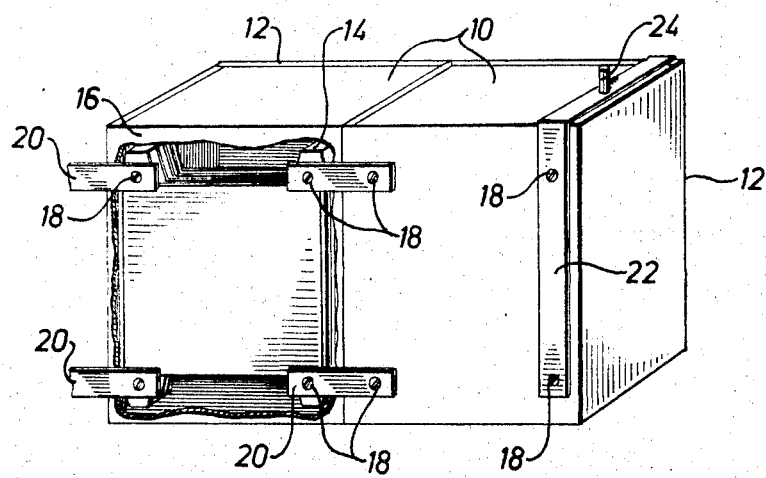
FIG. 3 is a partially exposed perspective view of part of an accumulator battery according to the invention.

In FIG. 3 two accumulator cells 10 have cell boxes 12 of electrically insulating material. 14 is a group of electrodes of a given polarity, e.g., positive, and 16 is then a negative group of electrodes. The current is withdrawn from the groups of electrodes through current discharging means 18, which at the same time clamp the groups of electrodes 14, 16 to the inside of the wall of the cell box 12 and the connecting bars 20 to the outside of the same wall (see also FIG. 4). One external terminal of the battery, which in this case is the positive, consists of a bar 22, which matches the outer shape of the cell box 12, with a battery connecting piece 24, the bar being connected by means of current discharging means 18 to all current discharge lugs from the positive group of electrodes in the accumulator cell.

Figure 4:
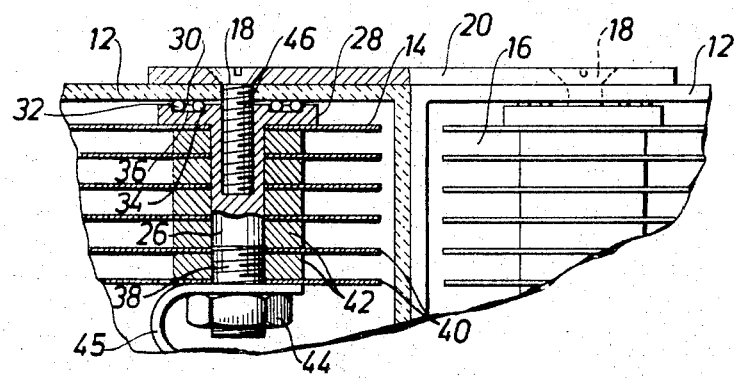
FIG. 4 shows a partially sectioned part of a plate strap with current discharging means and connecting bar in an accumulator battery with cell box of insulating material according to the invention.

In FIG. 4 a plate strap 26 has its end facing the wall of the box 12 formed as a flange 28. In the flange is a cut-out 30 in which a packing in the form of an O-ring 32 of larger diameter and a packing in the form of an O-ring 34 of smaller diameter are essentially concentrically placed. The space 36 between the O-rings 32, 34 and the flange 28 and the wall of the box 12 is filled with a non-drying sealing agent, e.g., a liquid resin, which is available commercially under the tradename "Opanol," which is a liquid or semi-liquid polymerization product of isobutylene having good electrical insulating properties and resistant to both acids and lyes. The end of the plate strap 26 remote from the flange has an external thread 38. Groups of electrodes 40 and spacers 42 with holes or slots for the plate strap are fitted over the plate strap 26 and clamped between the flange 28 and nut 44 to form a group of electrodes 14 or 16. Alternatively the end of the plate strap 26 can have an internal thread and the electrode plates 40 with intermediate spacers 42 can be clamped to the flange 28 with a headed screw. At the same end as the flange 28 the plate strap 26 has an internal thread 46 into which the current discharging means 18 fits. The group of electrodes 14, 16 and the connecting bar 20 are clamped by the current discharging means to the wall of the box 12 as already described. A connecting device 45 can be attached by its end to the group of electrodes 14 or 16, e.g., with the nut 44 or a headed screw in accordance with the aforesaid alternative. This connecting device 45 is made of an electrically conductive material and is preferably, though not necessarily, flexible. Its other end is attached in the same or similar manner to another group of electrodes 14 or 16 of the same polarity (not shown in the figure), which is clamped in the same way as shown in the figure, but to the opposite wall of the cell box.

Figure 5:
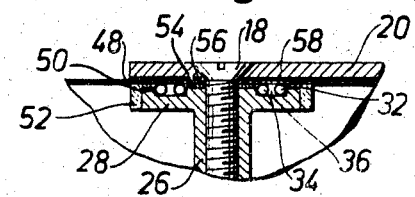
FIG. 5 shows the attachment of the plate strap in a cell box of electrically conductive material.

In FIG. 5 the wall of the box 48 is made of an electrically conductive material, e.g., steel plate. A packing of insulating material 50 and with larger diameter of hole than the outer diameter of the O-ring 32 is placed between the wall of the box 48 and the flange 28. The packing 50 may advantageously have a collar 52 which partially surrounds the outer edge of the flange 28. Another packing of insulating material 54 has an outer diameter which is less than the inner diameter of the O-ring 34. The packing has a collar 56 which extends through a hole in the wall of the box 48 and the inner diameter of which matches the outer diameter of the current discharging means 18. A packing 58 is placed between the wall of the box 48 and the connecting bar 20. This packing 58 can advantageously have the same surface dimensions as the connecting bar 20 and thus be common to two accumulator cells.

Figure 6:
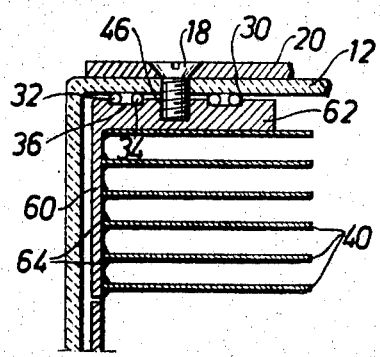
FIG. 6 shows the attachment of an alternative type of plate strap with welded electrode plates.

FIG. 6 shows an alternative type of plate strap 60 with an angular flange 62, which is thickened in the example shown. The electrode plates 40 are fastened to the plate strap 60 in the known manner by means of welds 64. In the manner described with reference to FIG. 4 the flange 62 has a cut-out 30 and an internal thread 46. The sealing and clamping to the wall of the box 12 are achieved in the same way as described with reference to FIG. 4.

Figure 7:
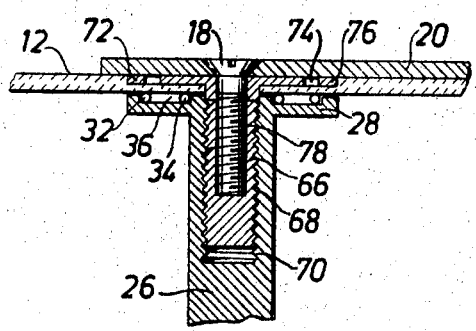
FIG. 7 shows a fastening device for the electrode groups for use for extensible cells, designed for cell boxes of insulating material.

FIG. 7 shows a fastening device 66 with external thread 68 fitting into the corresponding internal thread 70 in the plate strap 26. With its externally threaded portion 68 the fastening device 66 is threaded from without through a hole in the wall of the box 12. On the outside of the wall of the box 12 the fastening device 66 has a flange 72 which is furnished with some form of key-grip 74. In the example illustrated the key-grip has the form of two holes. In order that the outer surface of the flange 72 shall come in the same plane as the outer surface of the wall of the box 12, the latter has a depression 76. The fastening device 66 is furnished from the flange side with an internal thread 78 which fits the thread of the current discharging means 18. The seal between the plate strap 26 and the wall of the box 12 is achieved in the same way as previously described with reference to FIG. 4.

Figure 8:
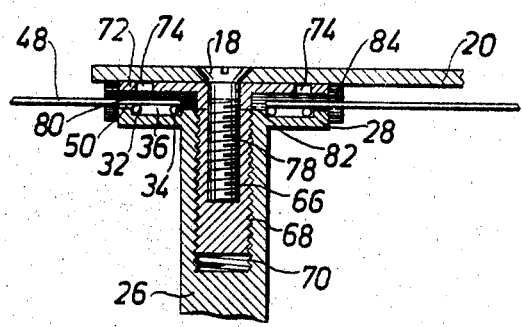
FIG. 8 shows the same device for cell boxes of electrically conductive material.

FIG. 8 shows the same construction as FIG. 7, but attached to a box wall 48 of electrically conductive material. Between the flange 28 and the wall of the box 48 is placed a packing 50 of the same type as described under FIG. 5. Between the flange 72 on the fastening device 66 and the wall of the box 48 has been placed a packing 80 of electrically insulating material. In the example shown the packing 80 has a collar 82 extending through the hole in the wall of the box 48 and an outer flange 84 which partially surrounds the outer edge of the flange 72.

Figure 9:
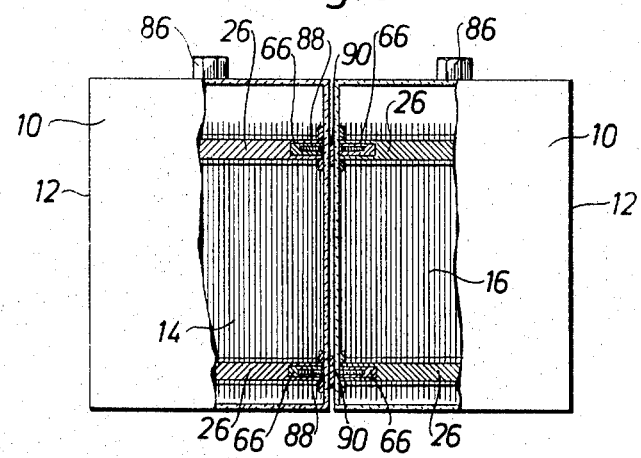
FIG. 9 is a partially sectioned side view of two accumulator cells coupled together by an alternative method.

FIG. 9 shows two accumulator cells 10 with cell box 12, each having a filling valve 86. A positive group of electrodes 14 in one accumulator cell is coupled to a negative group of electrodes 16 in the other accumulator cell. Each group of electrodes has two plate straps 26 with fastening device 66. The accumulator cells 10 are electrically and mechanically coupled together by current discharging means 88 which are screwed down by means of the washers 90 with key-grip.

Figure 10:
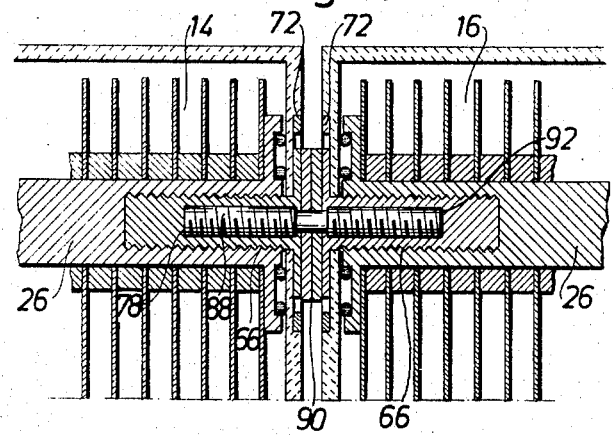
FIG. 10 shows an enlarged section of a coupling device for coupling according to FIG. 9.

FIG. 10 shows a positive group of electrodes 14 and a negative group of electrodes 16 with plate straps 26 and fastening devices 66, one of which has an internal right-hand thread 78 and the other an internal left-hand thread 92. Into these threads is drawn a current discharging means 88 by means of the washer 90 slidably but not rotatably placed on it. A good electrical contact is achieved via the two flanges 72 on the fastening devices 66 and the washer 90 made of electrically conductive material.

Figure 11:
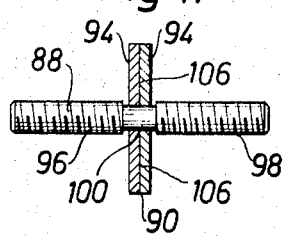
FIG. 11 shows a detail of a current discharging means according to FIGS. 9 and 10.

FIG. 11 shows a current discharging means 88 formed as a bolt with an external right-hand thread 96 and an external left-hand thread 98 and, between these threads, a part 100 which in the example shown has two milled portions so as to follow the rotation of the washer 90 placed round the part 100. This washer 90, through two spot welds 106, is composed of two identical halves 94.

Figure 12:
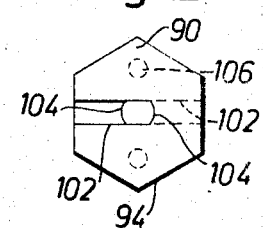
FIG. 12 shows a side-view of a washer for the current discharging means according to FIG. 11.

FIG. 12 shows a washer 90 composed of two halves 94. Each half has a slot 102 running across the center of the washer and terminating in a rounded portion 104. For mounting of the current discharging means 88 a washer 94 is passed over the milled part 100 from each side and the two halves are joined together with two spot welds 106. On coupling together of two accumulator cells the cells will always be tightly drawn together irrespective of whether the left-hand and right-hand threads grip simultaneously and irrespective of any differences in tolerance which may exist between the various accumulator cells. In the example in the figure the washer 90 is shown with a key-grip in the form of a hexagon. Obviously any other kind of key-grip with which the washer can be turned with a tool serves the same purpose. Furthermore the slidability of the washer on the current discharging means can be otherwise arranged. For example an axial slot can be milled in the current discharging means and a tap-screw screwed into it via a radially threaded hole in the washer.

What I claim is:

1. Electric accumulator cell or accumulator battery assembly in which each accumulator cell consists of a cell box, positive and negative essentially plane electrode plates joined together into positive and negative groups of electrodes by means of plate straps, a liquid electrolyte, and current discharging means for withdrawal of current from said electric accumulator battery, characterized in that the current withdrawal from the respective electrode plates or electrode groups (14, 16) takes place through at least two current discharging means (18) connected to the corresponding number of plate straps (26) on the electrode plates or electrode groups, at least one of the positive or negative current discharging means (18) extending in sealing relationship perpendicularly through the side-wall of the cell box (12) below the electrolyte level the ends of the plate straps (26) facing the wall of the box (12) being formed as a flange (28), between which flange (28) and the wall of the box (12) are placed, essentially concentrically with said flange, two packing (32, 34) of plastic material and having different diameter holes therethrough to form a space therebetween, in said space (36) between said packings, said flange and the wall of the box is contained a non-drying sealing agent which is resistant to the electrolyte in the box (12).

2. Electric accumulator cell according to claim 1, characterized in that the two packings (32, 34) of plastic material have the form of O-rings.

3. Electric accumulator cell according to claim 1, characterized in that the non-drying sealing agent consists of a liquid resin.

4. Electric accumulator cell according to claim 1, characterized in that the plate straps (26) are attached to the wall of the cell box (12) by means of fastening device (66) formed as externally threaded (68) bolts fitting into a corresponding internal thread (70) in each plate strap (26), the bolts having at one end a flange (72) and an internal thread into which the respective current discharging means (18) are fastened.

5. Electric accumulator cell according to claim 1, characterized in that insulating washers (54, 58) are placed on each side of the wall of the box (48) at the passage of the current discharging means through the side-wall of the cell box.

6. Electric accumulator cell according to claim 1, characterized in that the ends of the plate straps remote from the flange have an external (38) or internal thread and that electrode plates with intermediate spacers (42) are clamped between the flange (28) and a nut (44) or headed screw tightened in the thread.

7. Electric accumulator cell according to claim 1, characterized in that the number of electrode plates of the same polarity is divided into two groups and that the current discharge lugs (18) are led out through two opposing walls in the cell box (12).

8. Electric accumulator cell according to claim 7, characterized in that the two groups of electrodes of the same polarity are joined together by an electrically conductive connecting device (45).

9. Electric accumulator battery composed of accumulator cells according to claim 4, characterized in that each current discharging means (88) is common to two adjacent cells (10) and has the form of a bolt with external right-hand thread (96) at one end and external left-hand thread (98) at the other end and a washer (90) with external key-grip slidably but not rotatably placed on the bolt.

10. Electric accumulator battery composed of accumulator cells according to claim 4, characterized in that the accumulator cells (10) have the fastening devices (66) for the current discharging means left-hand-threaded (92) for a group of electrodes of a given polarity and right-hand-threaded (78) for a group of electrodes of opposing polarity.

* * * * *

UNITED STATES PATENT OFFICE
CERTIFICATE OF CORRECTION

Patent No. 3,762,958          Dated October 2, 1973

Inventor(s) John Fredrik KUYLENSTIERNA

It is certified that error appears in the above-identified patent and that said Letters Patent are hereby corrected as shown below:

In the Heading:

The claim to priority was omitted. Please insert the following:

--Priority Data

Sweden     1630/70 ....... February 9, 1970--

Signed and sealed this 15th day of January 1974.

(SEAL)
Attest:

EDWARD M. FLETCHER, JR.        RENE D. TEGTMEYER
Attesting Officer             Acting Commissioner of Patents